US005392217A

United States Patent [19]
Nashiki et al.

[11] Patent Number: 5,392,217
[45] Date of Patent: Feb. 21, 1995

[54] APPARATUS AND METHOD FOR CONTROLLING ACCELERATION AND DECELERATION FOR NUMERICALLY CONTROLLED MACHINE

[75] Inventors: Masayuki Nashiki; Hisashi Kondo, both of Niwa, Japan

[73] Assignee: Okuma Corporation, Niwa, Japan

[21] Appl. No.: 240,183

[22] Filed: May 9, 1994

[30] Foreign Application Priority Data

May 10, 1993 [JP] Japan .................................. 5-108300

[51] Int. Cl.$^6$ .................................................. G05B 11/18
[52] U.S. Cl. ............................. 364/474.3; 364/474.31; 318/568.18; 318/571; 318/573; 318/636
[58] Field of Search ............ 364/167.01, 178, 174, 364/474.28, 474.3, 474.31; 318/568.18, 561, 571, 573, 615, 616, 618, 636

[56] References Cited

U.S. PATENT DOCUMENTS

| | | | |
|---|---|---|---|
| 4,554,497 | 11/1985 | Nozawa et al. | 318/636 |
| 4,706,003 | 11/1987 | Nakashima et al. | 318/568.18 |
| 5,309,074 | 5/1994 | Mizukami | 318/571 |

*Primary Examiner*—Roy N. Envall, Jr.
*Assistant Examiner*—Steven R. Garland
*Attorney, Agent, or Firm*—Dickstein, Shapiro & Morin

[57] ABSTRACT

An acceleration and deceleration controlling apparatus in which a positional moving amount supplied from a host is converted into an accumulated value of absolute positions by two serially connected accumulators to be output to a first stage of a buffer registers 4. A switch 5 is provided to read out a value from a desired register among the buffer registers 4. The switch 5 changes the substantial number of stages of the buffer registers 4. At the same time, by correspondingly switching the divisor of the divider 7, the time constant for the acceleration and deceleration are desirably changed, which contributes to optimize the acceleration and deceleration time and to reduce the processing time.

4 Claims, 13 Drawing Sheets

| SAMPLING TIMES | INPUT | BUFFER REGISTER #1 #2 #3 | ACCUMULATOR | QUOTIENT | REMAINDER | CARRY FROM REMAINDER | OUTPUT |
|---|---|---|---|---|---|---|---|
| INITIAL VALUE | | 0 0 0 | 0 | 0.0 | 0.0 | | 0.0 |
| 1 | 1 | 1 0 0 | 1 | 0.3 | 0.1 | | 0.3 |
| 2 | 1 | 1 1 0 | 2 | 0.6 | 0.2 | | 0.7 |
| 3 | 1 | 1 1 1 | 3 | 1.0 | 0.0 | 0.1 | 1.0 |
| 4 | 0 | 0 1 1 | 2 | 0.6 | 0.2 | | 0.6 |
| 5 | 0 | 0 0 1 | 1 | 0.3 | 0.1 | 0.1 | 0.4 |
| 6 | 0 | 0 0 0 | 0 | 0.0 | 0.0 | | 0.0 |
| TOTAL | 3 | | | 2.8 | 0.6 | 0.2 | 3.0 |

Fig. 5 PRIOR ART

| SAMPLING TIMES | INPUT | BUFFER REGISTER #1 | #2 | #3 | ACCUMULATOR | QUOTIENT | REMAINDER | CARRY FROM REMAINDER | OUTPUT |
|---|---|---|---|---|---|---|---|---|---|
| INITIAL VALUE | | 0 | 0 | 0 | 0 | 0.0 | 0.0 | | 0.0 |
| 1 | 0 | 1 | 0 | 0 | 1 | 0.3 | 0.1 | | 0.3 |
| 2 | 1 | 1 | 1 | 0 | 2 | 0.6 | 0.2 | | 0.7 |
| 3 | 1 | 1 | 1 | 1 | 3 | 1.0 | 0.0 | 0.1 | 1.0 |
| 4 | 1 | 0 | 1 | 1 | 2 | 0.6 | 0.2 | | 0.6 |
| 5 | 0 | 0 | 0 | 1 | 1 | 0.3 | 0.1 | 0.1 | 0.4 |
| 6 | 0 | 0 | 0 | 1 | 1 | 0.3 | 0.1 | | 0.3 |
| 7 | 0 | 0 | 0 | 0 | 1 | 0.3 | 0.1 | | 0.3 |
| 8 | 0 | 0 | 0 | 0 | 1 | 0.3 | 0.1 | 0.1 | 0.4 |
| TOTAL | 3 | | | | | 3.7 | 0.0 | 0.3 | 4.0 |

Fig. 6 PRIOR ART

| SAMPLING TIMES | INPUT | BUFFER REGISTER | | | ACCUMULATOR | QUOTIENT | REMAINDER | CARRY FROM REMAINDER | OUTPUT |
| --- | --- | --- | --- | --- | --- | --- | --- | --- | --- |
| | | #1 | #2 | #3 | | | | | |
| INITIAL VALUE | | | | | | | | | |
| 1 | 0 | 0 | 0 | 0 | 0 | 0.0 | 0.0 | | 0.0 |
| 2 | 1 | 1 | 0 | 0 | 1 | 0.3 | 0.1 | | 0.3 |
| 3 | 1 | 1 | 1 | 0 | 2 | 0.6 | 0.2 | | 0.7 |
| 4 | 1 | 1 | 1 | 1 | 3 | 1.0 | 0.0 | 0.1 | 1.0 |
| 5 | 0 | 0 | 1 | 1 | 1 | 0.3 | 0.1 | | 0.3 |
| 6 | 0 | 0 | 0 | 1 | 0 | 0.0 | 0.0 | | 0.0 |
| 7 | 0 | 0 | 0 | 0 | 0 | 0.0 | 0.0 | | 0.0 |
| 8 | 0 | 0 | 0 | 0 | 0 | 0.0 | 0.0 | | 0.0 |
| TOTAL | 3 | | | | | 2.2 | 0.1 | 0.1 | 2.3 |

Fig. 7 PRIOR ART

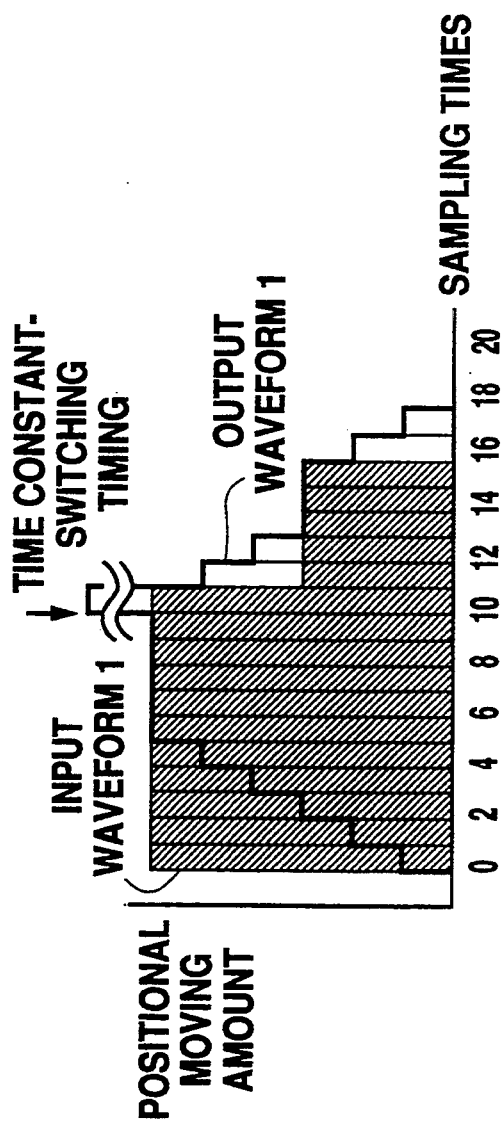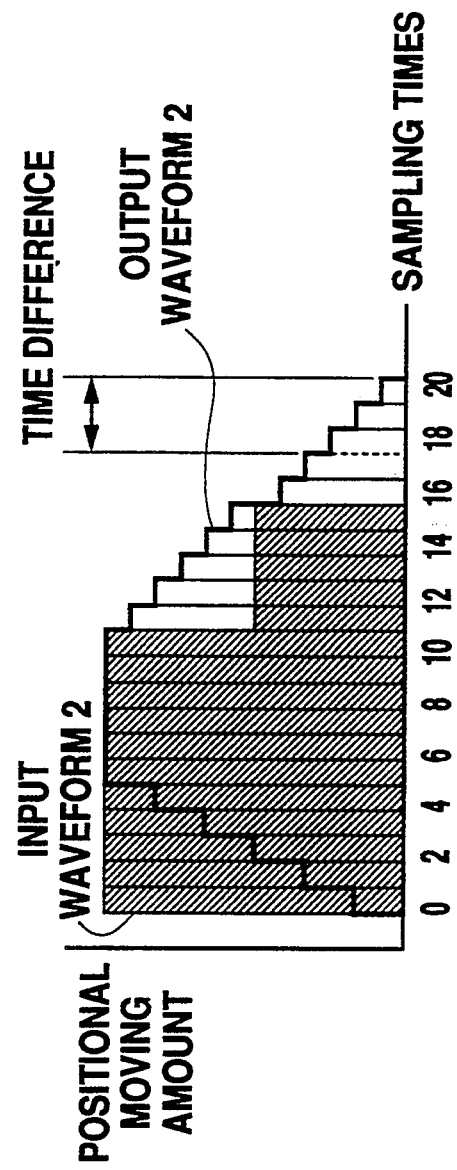

APPARATUS AND METHOD FOR CONTROLLING ACCELERATION AND DECELERATION FOR NUMERICALLY CONTROLLED MACHINE

BACKGROUND OF THE INVENTION

1. Field of the Invention

The present invention relates to a numerically controlled machine for controlling a position and a moving speed of a movable shaft of a machining apparatus, and more particularly to a numerically controlled machine capable of changing acceleration and deceleration times.

2. Description of the Prior Art

There is well known, a numerically controlled machine for controlling a movable shaft of a machining apparatus by numerical values for predetermined operation. In such a numerically controlled machine, a control command is ordered as a moving amount of a movable shaft for each sampling period. An initially ordered amount is called rough interpolation data, which are data not taking the inertia of a movable part of the machine, and the output capable of being generated from driving mechanism, into consideration. Namely, there is no consideration of any of the following characteristics of the flexible part during the period of acceleration from static state to constant speed movement, and conversely during the period of deceleration from the constant speed to the static state. In such a conventional apparatus, the static state is suddenly changed to the constant speed without gradual acceleration.

However, the inertia of the movable part and the output being capable of produced by the driving mechanism are previously defined by specification of each apparatus, so that there are naturally upper limits for the speed and the acceleration that can be practically generated. Accordingly, it is necessary to produce controlling data of the accelerating and decelerating periods from the rough interpolating data. The numerically controlled apparatus generally has an accelerating and decelerating circuit for calculating controlling data of accelerating and decelerating periods which are necessary for driving a practical apparatus.

A device described in "ACCELERATING AND DECELERATING CIRCUIT" (Japanese Patent Laid-Open No. Sho 59-62909) will now be mentioned as a conventional art with reference to FIG. 1. A rough interpolator 11 generates rough interpolation data $\Delta X$ for each sampling period and input them to an accelerating and decelerating circuit 17. This circuit 17 comprises n buffer registers 12 consisting of #1, #2, ... #(n−1), #n, an adder 13, an accumulator 14 for temporarily storing the added result, a register 15 for transferring the added result, and a divider 16 for dividing the added result by n. The buffer registers #1–#n are serially connected to store the latest rough interpolation $\Delta X_n$ in the buffer register #1 for each sampling period and transfer the contents of each buffer register to the buffer register of the next stage, and then input the contents $\Delta X_0$ of the buffer register of the final stage to the adder 13. Accordingly, at a sampling time point, the adder performs the following calculation with the contents of the register 15 as St:

$$\Delta X_n - \Delta X_0 + St \rightarrow St$$

to store the calculated result in the accumulator 14. The contents of the accumulator 14 are divided by n in the divider 16 and are then output as interpolation data after the accelerating/decelerating process. At the same time, the contents of the buffer registers (#1–#n) are shifted to the buffer of the next stage, $\Delta X_n$ is stored in the first buffer register #1, and the contents St of the accumulator 14 is transferred to the register 15.

The aforementioned conventional apparatus is advantageous in reducing the route error during the synchronous operation of a plurality of shafts with a simple structure. Since the time constant for acceleration and deceleration is fixed, however, the time required for acceleration and deceleration would become unnecessarily long depending on the feeding speed, resulting in long driving time from starting to stopping. This is shown in FIGS. 2A–2C. In FIGS. 2A–2C, the vertical and the horizontal axis represent rough interpolation amount at each sampling time point and number of sampling times respectively.

An output waveform 1 (thick line) represents a state when an input waveform 1 (oblique line) in FIG. 2A with the number of the register buffer stages in FIG. 1 being six is input to the accelerating and decelerating circuit 17 in FIG. 1. In the conventional device, since the acceleration and deceleration have been performed at a fixed time constant regardless of the feeding speed, an output waveform 2 is obtained for the input waveform 2 shown in FIG. 2B when the feeding speed is half thereof. Here, the acceleration obtained from the output waveform 2 is a half of the output waveform 1, so that the driving system can still afford to improve its performance. At this time, if the time constant of the acceleration and deceleration can be shortened to a half, this means that the acceleration and deceleration is carried out with the same rate as in the case of the output waveform 1, resulting in the output waveform 3 for the input waveform as shown in FIG. 2C so as to reduce the driving time. In the shown example, the area of the portion surrounded by a trapezoid stands for a total moving amount, and both portions surrounded by the output waveform 2 and 3 have the same area. In other words, in the conventional device, this time difference has been wasted in vain. In machining apparatus processes, when acceleration and deceleration are frequently performed, the processing time will be greatly affected depending on whether the accelerating and decelerating time constant is fixed or varied.

To cope with such a disadvantage, it has been desired to provide a device capable of changing the time constant at the time of acceleration and deceleration. There will be considered a case in which the device shown in FIG. 1 is provided with a buffer register having a switch 5, and the number of stages of the buffer register is changed from three to two. The rough interpolation data to be input is composed of three times continued magnitude "1" as shown in FIG. 4. The divider calculates down to the first decimal place, and performs a residual process for the residual. The residual process is aimed at processing the residual generated by the 1/n dividing process by the divider and comprises the steps of: providing an accumulator and an adder separately; summing residuals at each sampling period and accumulating them in the accumulator; and adding one to the output of the divider and outputting the added result. This process realizes an accelerating/decelerating process with a high accuracy. A result of a case where no switching is performed will now be described with reference to FIG. 5. The initial values of the buffer register, the accumulator and the register are all zero.

When "1" is input at the first sampling time, "1" is stored in the buffer register #1. Meanwhile, as a result of a subtraction of the output "0" of the buffer register #3 which is the final stage of the buffer register from the sum of the input "1" and the contents "0" of the register, "1" is input to the accumulator. The divided result becomes "0.3" with a residual "0.1" so as to render an output "0.3".

At the second sampling time, the input is also "1", and the content "1" of the buffer register #1 is shifted to the buffer register #2. The input "1" is stored in the buffer register #1. As a result of subtraction of the output "0" of the buffer register #3 which is the final stage of the buffer register from the sum of the input "1" and the content "1" of the register, "2" is input to the accumulator. As a result, the quotient will become "0.6" with a residual "0.2". A carry from the total residual "0.3" (0.1+0.2") will become "0.1" which is then summed with a carry "0.1" from the quotient "0.6" and the total residual "0.1", resulting in a sum "0.7" as an output.

At the third sampling time, the input is also "1" and the content "1" of the buffer register #1 is shifted to the buffer register #2 while the content of the buffer register #2 is shifted to the buffer register #3. The input "1" is stored in the buffer register #1. As a result of subtraction of the output "0" of the buffer register #3 which is the final stage of the buffer register from the sum of the input "1" and the content "2" of the register, "3" is input to the accumulator. The quotient then becomes "1" with a residual "0" and an output "1".

At the fourth sampling time, the input is "0" and the content of the buffer register #2 is shifted to the buffer register #3 while the content "1" of the buffer register #1 is shifted to the buffer register #2. The input "0" is stored in the buffer register #1. As a result of the subtraction of the output "1" of the buffer register which is the final stage of the buffer register from the sum of the input "0" and the content "3" of the register, "2" is input to the accumulator. Then the quotient becomes "0.6" with a residual "0.2" and an output "0.6".

At the fifth sampling time, the input is also "0", and the content of the buffer register #2 is shifted to the buffer register #3 while the content of the buffer register #1 is shifted to the buffer register #2. The input "0" is stored in the buffer register #1. As a result of subtraction of the output "1" of the buffer register #3 being the final stage of the buffer register from the sum of the input "0" and the content "2" of the register, "1" is input to the accumulator. The quotient then becomes "0.3" with a residual "0.1", so that the total residual, summed with the previous residual "0.2", becomes "0.3". Therefore, the carry from the total residual "0.3" becomes "0.1" with an output "0.4" as a sum of the quotient "0.3" and the carry "0.1" from the residual.

At the sixth sampling time, the input is also "0", and the content of the buffer register #2 is shifted to the buffer register #3 while the content of the buffer register #1 is shifted to the buffer register #2. The input "0" is stored in the buffer register #1. As a result of subtraction of the output "1" of the buffer register #3 being the final stage of the buffer register from the sum of the input "0" and the content of the register "1", "0" is input to the accumulator. Then the divided result is "0" with a residual "0" and an output "0". Hereafter, all the outputs will be "0". Consequently, the total of the inputs and outputs are equally "3", so as to enable accurate accelerating and decelerating processes.

A case where the switching operation is carried out will now be described with reference to FIG. 6. The initial value and the input are the same as those in FIG. 5, and the number of stages of the buffer register is switched after the third sampling time. Namely, from the fourth sampling time, the output of the buffer register #2 is supplied to the accumulator while the output of the buffer register #3 is discarded. Until the third sampling time, the processes are the same as those in FIG. 5.

The number of stages is switched before the fourth sampling time. The input becomes "0" at the fourth sampling time, and the content of the buffer register #1 is shifted to the buffer register #2 while the input "0" is stored in the buffer register #1. As a subtraction of the output "1" of the buffer register #2 being a new final stage of the buffer register from the sum of the input "0" and the content "3" of the register, "2" is input to the accumulator. Thus, the quotient is "0.6" with a residual "0.2" and an output "0.6".

At the fifth sampling time, the input is also "0" and the content of the buffer register #1 is shifted to the buffer register #2. The input "0" is stored in the buffer register #1. As a result of the subtraction of the output "1" of the buffer register #2 being a new final stage of the buffer register from a sum of the input "0" and the content "2" of the register, "1" is input to the accumulator. Thus the quotient is "0.3" with a residual "0.1", so that a carry from the total residual 0.3(=0.1+0.2) becomes "0.1", rendering an output "0.4" as a sum of the quotient "0.3" and the carry from the residual "0.1".

After the fifth sampling time, the content of the buffer register always becomes "0" so as to store "1" in the accumulator, the output of "0.3" or "0.4" will continue forever. In this manner, it is impossible to perform a correct acceleration just by switching the number of stages of the buffer register.

Further a case where the content of the buffer register to be eliminated is subtracted from the accumulator is shown in FIG. 7. The initial value and the input value are the same as in FIG. 5, and the contents of the buffer register #3 and the output of the buffer register #2 are simultaneously subtracted from the accumulator at the fourth sampling time. Until the third sampling time, the processes are the same as in FIG. 5.

The number of stages of the buffer register is switched at the fourth sampling time. At the fourth sampling time, the input is "0", and the content of the buffer register #1 is shifted to the buffer register #2 while the input "0" is stored in the buffer register #1. As a result of subtraction of the output "1" of the buffer register #2 being the new final stage of the buffer register and the content "1" of the buffer register #3 to be eliminated, "1" is input to the accumulator. Then the quotient becomes "0.3" with a residual "0.1" and an output "0.3".

At the fifth sampling time, the input is also "0", and the content of the buffer register #1 is shifted to the buffer register #2 while the input "0" is stored in the buffer register #1. As a result of subtraction of the output "1" of the buffer register being the final stage of the buffer register from the sum of the input "0" and the content "1" of the register, "0" is input to the accumulator. Thus, the quotient becomes "0" with a residual "0" and an output "0".

After the fifth sampling time, the output always becomes "0". Consequently, the total of the output will be "2.3" being different from the input "3" so as to be unable to perform accurate acceleration and deceleration processes. Furthermore, as to the residual process, while the total of the residual becomes "0.6" with a carry so as to render a residual "0" in FIG. 5, a residual "0.1" remains in FIG. 7. This means that it is necessary to operate the switching time for the residual process in order to provide accurate acceleration and deceleration processes.

As has described above, the machine using the conventional acceleration and deceleration processes for changing the time constant required a series of complicated processes in one sampling period. For example, replacement of buffer registers calculation of St in number of stages having been shortened (or extended) and calculation of residuals are required during one sampling period. Therefore, the operation to switch the time constant will be significantly burdensome for the total process. If it is necessary to change several-tens or several-hundred stages, the processing burden would be so heavy that the time constant could not be changed by the conventional accelerating/decelerating method.

In the conventional acceleration and deceleration method, it has been difficult to change the acceleration and deceleration time constants to desired values at a desired timing due to the increase of the burden. As a result, the operation time could not be shortened, impeding the efficiency of the processing time from being improved.

SUMMARY OF THE INVENTION

In view of these points, the present invention is aimed at providing an acceleration and deceleration controlling apparatus which is capable of switching the acceleration and deceleration time constant at a desired timing with a reduced processing burden.

According to an aspect of this invention, there is provided an acceleration and deceleration controlling apparatus comprising: a first accumulator for accumulating a positional moving amount supplied from a host controller at each sampling time to calculate an absolute position X; a second accumulator for further accumulating absolute positions from the first accumulator to calculate accumulated values of the absolute position; a series of serially connected buffer registers in which a buffer register of the first stage stores the latest accumulated value of the absolute position at each sampling time and supplying the value stored in the previous sampling time to a buffer register of the next stage; a switch for reading out the stored content from a buffer register of number defined by a time constant switching signal supplied from the host controller; a subtracter for subtracting the content of the buffer register read out by the switch from the latest accumulated value of the absolute position; a divider for dividing the calculated value of the subtracter from a quotient defined by a quotient switching signal supplied from the host controller; and a difference calculator for calculating a difference between the quotient and the quotient of the previous sampling time having been stored.

Further, the apparatus comprises an interpolator for calculating a difference between the results from the differentiator of this time and the previous time by an interpolator-starting signal from the host controller for outputting an interpolation amount corresponding to the difference value; and an adder for adding the interpolation amount to the output of the differentiator.

In the conventional apparatus the positional moving amount itself (equivalent to rough interpolation data in the conventional method) from the host controller has been stored in the buffer register, but in this invention the positional moving amount is input to a first stage of the buffer registers after being converted into an accumulated value of absolute position by the use of two serially connected accumulators. Further, a switching means is provided for reading out a value from a desired buffer register. The switching means can change the substantial number of stages of the buffer registers and at the same time can also change the quotient of the divider in accordance therewith, so as to desirably change the time constant of the acceleration and deceleration.

The above and other objects, features and advantages of the present invention will become clear from the following description of the preferred embodiment thereof, taken in conjunction with the accompanying drawings.

BRIEF DESCRIPTION OF THE DRAWINGS

FIG. 5 shows the function of data in the conventional accelerating and decelerating apparatus;

FIG. 6 shows the function of data at the time of switching the time constant in the conventional accelerating and decelerating apparatus;

FIG. 7 shows the operation of data at the time of switching time constant in the conventional accelerating and decelerating apparatus;

FIGS. 11A and 11B are explanatory view for the acceleration and deceleration time constant and accelerating and decelerating processing;

DETAILED DESCRIPTION OF THE PREFERRED EMBODIMENT

Figure 8:
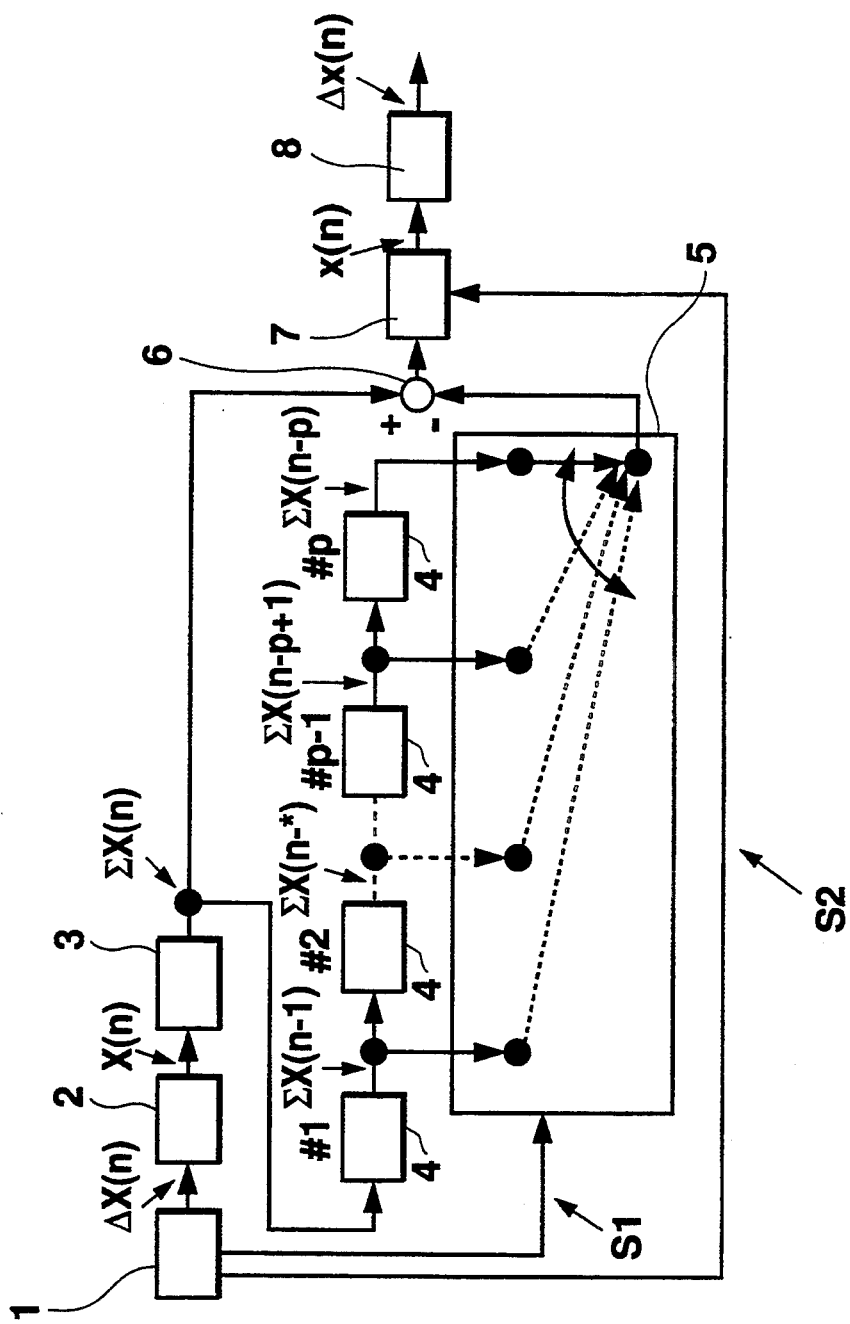
FIG. 8 is a block diagram schematically showing an embodiment of this invention.

FIG. 8 is a schematic block diagram according to a first embodiment of this invention. There are provided: an accumulator 2 for accumulating a positional moving amount $\Delta X$ from a host controller 1 at each sampling period for calculating an absolute position X; an accumulator 3 for further accumulating absolute values X from the accumulator 2 for calculating accumulated value $\Sigma X$ of the absolute position; a series of serially connected p buffer registers #1, #2, ... # (p−1), #p for storing the accumulated value ΣX of the latest absolute position calculated by the accumulator 3 in the buffer register #1 and transferring the content of each buffer register to the buffer register of the next stage. A switching means 5 reads out the contents of the buffer register of a stage number designated by a time constant-switching signal S1 supplied from the host controller 1 and outputs them to a subtracter 6, which subtracts the contents of the buffer register having been read out from the switching means 5 from the accumulated value ΣX of the newest absolute position. A divider 7 divides the subtracted result by a divisor designated by a quotient switching signal S2 from the host controller 1. A differentiator 8 receives the quotient from the divider 7 for calculating a difference of that from one sample-previous input having been stored.

If positional increments $\Delta X(0)$, $\Delta X(1)$, ... $\Delta X(n-1)$, $\Delta X(n)$ are orderly provided by the host controller 1 at each sampling period, in which the latest positional moving amount supplied from the host controller 1 is $\Delta X(n)$, the absolute position $X(n)$ as an output from the accumulator 2 would be expressed as follows:

$$X(n) = \Delta X(0) + \Delta X(1) + \ldots + \Delta X(n)$$

The accumulated value $\Sigma X(n)$ of the absolute position as an output from the accumulator 3 would be expressed as follows:

$$\Sigma X(n) = X(0) + X(1) + \ldots + X(n)$$

Further, if the time constant of the actual acceleration and deceleration is (p* sampling period), then the output of the subtracter 6 will be as follows:

$$\Sigma X(n) - \Sigma X(n-p)$$

Meanwhile, the output of the divider 7 can be represented as follows:

$$\begin{aligned}
\{\Sigma X(n) &- \Sigma X(n-p)\}/p \\
&= \{(X(0) + X(1) + \ldots + X(n)) - (X(0) + \\
&\quad X(1) + \ldots + X(n-p))\}/p \\
&= \{X(n-p+1) + X(n-p+2) + \ldots + \\
&\quad X(n)\}/p
\end{aligned}$$

As a result, a positional increment $\Delta x(n)$ after the acceleration and deceleration processes as an output from the difference calculator 8 will be as follows:

$$\begin{aligned}
\Delta x(n) &= \{(\Sigma X(n) - \Sigma X(n-p))/p\} - \{(\Sigma X(n-1) - \\
&\quad \Sigma X(n-p-1))/p\} \\
&= \{(X(0) + X(1) + \ldots + X(n)) - (X(0) + \\
&\quad X(1) + \ldots + X(n-p))\}/p - \{(X(0) + \\
&\quad X(1) + \ldots + X(n-1)) - (X(0) + X(1) + \\
&\quad \ldots + X(n-p-1))\}/p \\
&= [\{X(n-p+1) + X(n-p+2) + \ldots + \\
&\quad X(n)\} - \{X(n-p) + X(n-p+1) + \ldots + \\
&\quad X(n-1)\}]/p \\
&= \{X(n) - X(n-p)\}/p
\end{aligned}$$

Figure 1:
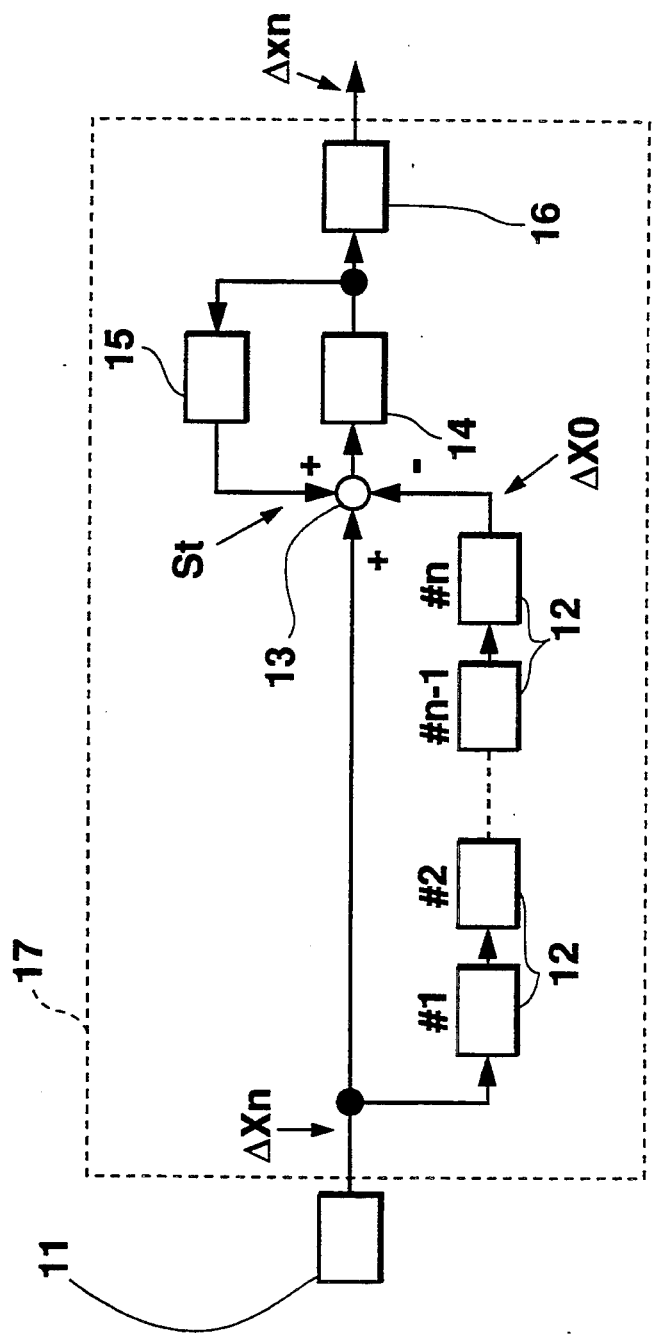
FIG. 1 is a block diagram schematically showing a conventional accelerating and decelerating apparatus.
Figures 2A, 2B, 2C:
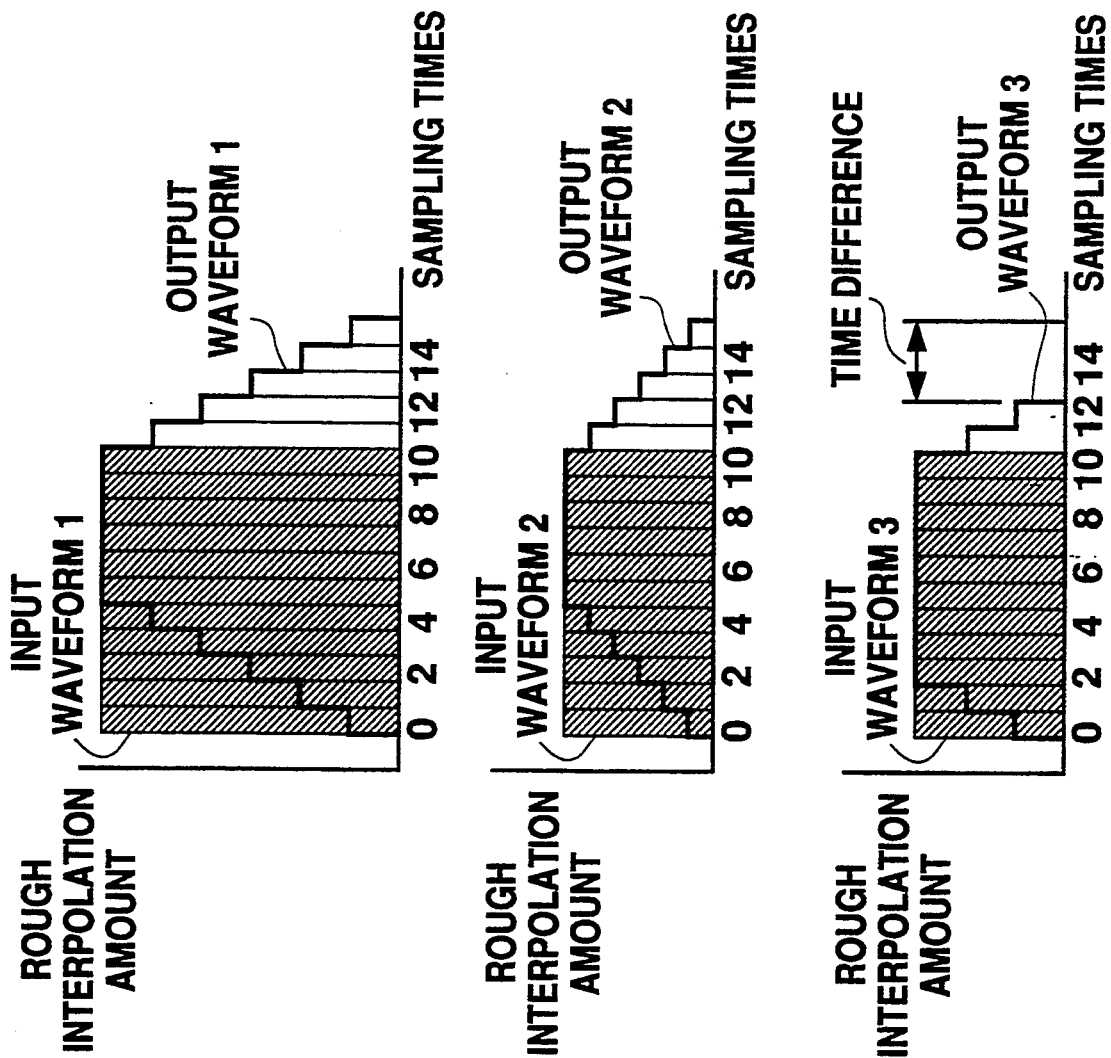
FIGS. 2A, 2B and 2C are explanatory graphs for the acceleration and deceleration time constant and the moving time.
Figure 3:
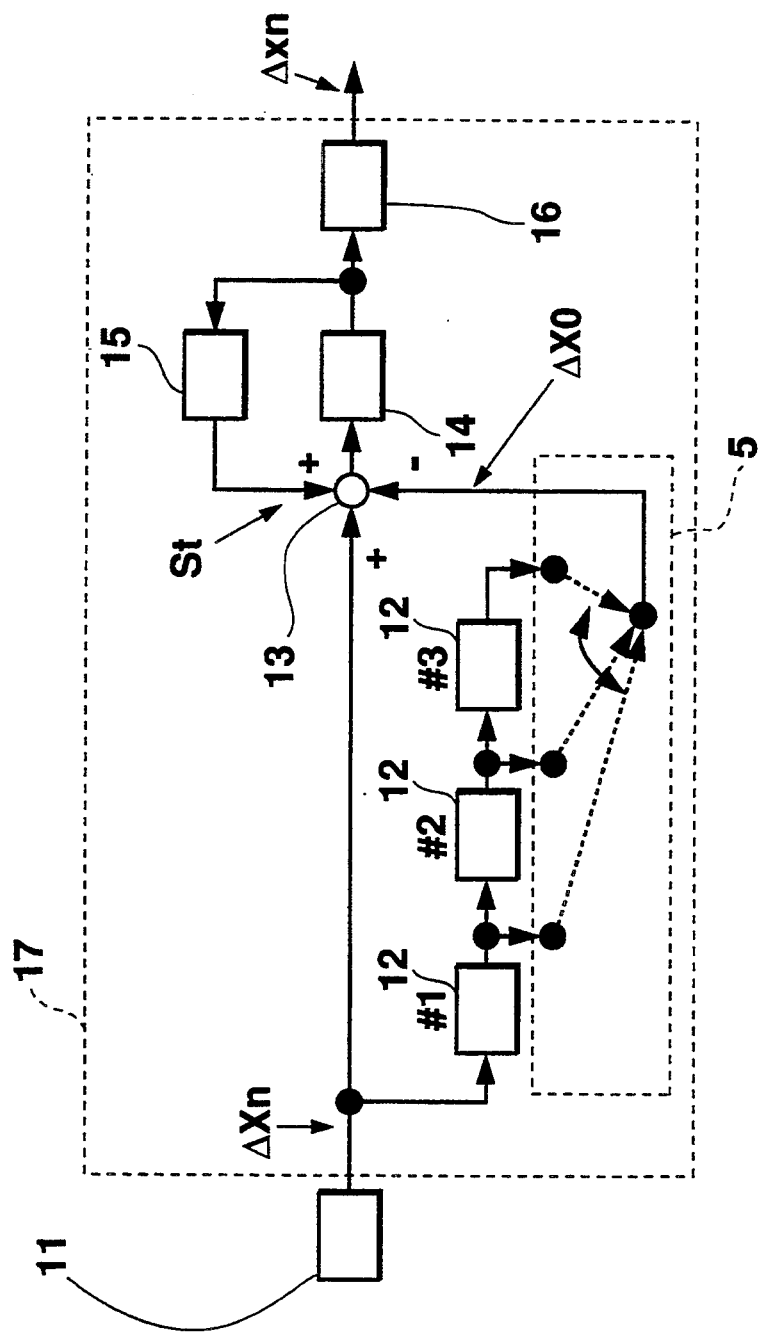
FIG. 3 is a block diagram for explanation of the switching operation for the time constant in the conventional accelerating and decelerating apparatus.
Figure 4:
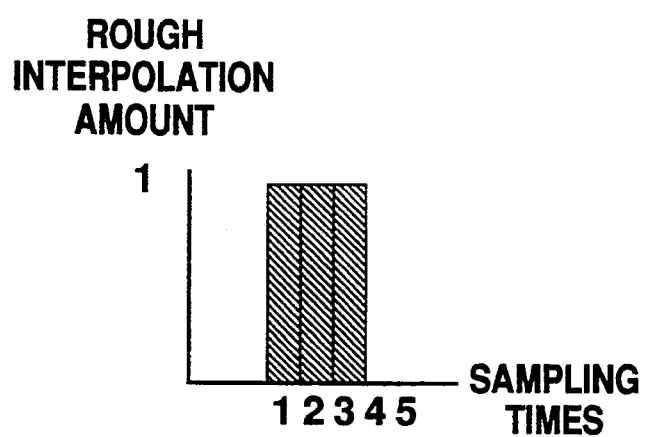
FIG. 4 is a supplementary graph for explanation of the time constant-switching operation in the conventional accelerating and decelerating apparatus.

On the other hand, in the conventional acceleration and deceleration processes, the content of the register in FIG. 1 is represented by $St(n)$ with the number of stages of the buffer registers being p (the time constant of the acceleration and deceleration is p* sampling period):

$$St(n) = St(n-1) + \Delta X(n) - \Delta X(n-p)$$

With the initial value of St being 0, $$St(n) = \Delta X(n-p+1) + \Delta X(n-p+2) + \ldots + \Delta X(n)$$

As a result, the output $\Delta x(n)$ of the divider 16 in FIG. 1 can be expressed as follows:

$$\begin{aligned}
\Delta x(n) &= St(n)/p \\
&= \{\Delta X(n-p+1) + \Delta X(n-p+2) + \ldots + \\
&\quad \Delta X(n)\}/p
\end{aligned}$$

In this case, since $\Delta X(*) = X(*) - X(*-1)$, the terms within the {} can be developed in the reverse order as follows:

$$\begin{aligned}
\Delta x(n) &= [\{X(n) - X(n-1)\} + \{X(n-1) - \\
&\quad X(n-2)\} + \ldots + \{X(n-p+1) - \\
&\quad X(n-p)\}]/p \\
&= \{X(n) - X(n-p)\}/p
\end{aligned}$$

Thus, it is understood that acceleration and deceleration processes are carried out in the manner mentioned above likewise the conventional method.

Next, a case will be considered where the time constant is changed to have m* sampling period at (n+1)-th time. In this case, the host controller 1 outputs a positional moving amount $\Delta X(n+1)$ and at the same time outputs a time constant-switching signal to the switching means 5 for switching the output to the subtracter 6 from #p to #m of the buffer registers 4, and outputs a divisor-switching signal to the divider for changing the quotient p to m. The output of the subtracter at (n+1)-th time will be as follows:

$$\begin{aligned}
\Sigma X(n+1) &- \Sigma X(n-m+1) \\
&= \{(X(0) + X(1) + \ldots + X(n+1)) - \\
&\quad (X(0) + X(1) + \ldots + X(n-m+1)\} \\
&= \{X(n-m+2) + X(n-m+3) + \ldots + \\
&\quad X(n+1)\}
\end{aligned}$$

At (n+2)-th time, it will be as follows:

$$\begin{aligned}
\Sigma X(n+2) &- \Sigma X(n-m+2) \\
&= \{X(n-m+3) + X(n-m+4) + \ldots + \\
&\quad X(n+2)\}
\end{aligned}$$

At the (n+1)-th time, the output of the divider 7 will be as follows:

$$\begin{aligned}
\{\Sigma X(n+1) &- \Sigma X(n-m+1)\}/m \\
&= \{(X(0) + X(1) + \ldots + X(n+1)) - \\
&\quad (X(0) + X(1) + \ldots + X(n-m+1))\}/m \\
&= \{X(n-m+2) + X(n-m+3) + \ldots + \\
&\quad X(n+1)\}/m
\end{aligned}$$

At the (n+2)-th time, it will be as follows:

$$\begin{aligned}
\{\Sigma X(n+2) &- \Sigma X(n-m+2)\}/m \\
&= \{X(n-m+3) + X(n-m+4) + \ldots + \\
&\quad X(n+2)\}/m
\end{aligned}$$

At (n+1)-th time, the positional increment $\Delta x(n)$ after the acceleration and deceleration processes as an output from a difference calculator 8 will be as follows:

$$\begin{aligned}
\Delta x(n+1) &= \{(\Sigma X(n+1) - \Sigma X(n-m+1))/m\} - \\
&\quad \{(\Sigma X(n) - \Sigma X(n-p))/p\} \\
&= \{(X(0) + X(1) + \ldots + X(n+1)) - \\
&\quad (X(0) + X(1) + \ldots + X(n-m+ \\
&\quad 1))\}/m - \{(X(0) + X(1) + \ldots + \\
&\quad X(n)) - (X(0) + X(1) + \ldots + \\
&\quad X(n-p))\}/p
\end{aligned}$$

-continued
$$= \{X(n - m + 2) + X(n - m + 3) + \ldots + X(n + 1)\}/m - \{X(n - p + 1) + X(n - p + 2) + \ldots + X(n)\}/p$$

At (n+2)-th time, it will become as follows:

$$\Delta x(n + 2) = \{(\Sigma X(n + 2) - \Sigma X(n - m + 2))/m\} - \{(\Sigma X(n + 1) - \Sigma X(n - m + 1))/m\}$$
$$= \{(X(0) + X(1) + \ldots + X(n + 2)) - (X(0) + X(1) + \ldots + X(n - m + 2))\}/m - \{(X(0) + X(1) + \ldots + X(n + 1)) - (X(0) + X(1) + \ldots + X(n - m + 1))\}/m$$
$$= [\{X(n - m + 3) + X(n - m + 4) + \ldots + X(n + 2)\} - \{X(n - m + 2) + X(n - m + 3) + \ldots + X(n + 1)\}]/m$$
$$= \{X(n + 2) - X(n - m + 2)\}/m$$

In this manner, after a transient (n+1)-th response just after the switching operation, it is switched to acceleration and deceleration processes with the acceleration and deceleration time constant as m* sampling period at (n+2)-th time. As a significant feature of this embodiment, when the positional increment Δx after the acceleration and deceleration processes is calculated by accumulation using a position controller etc. provided in the post-stage and not shown to render an absolute position, there will not arise any error by the switching operation of the time constant for the acceleration and deceleration. This is because the input to the divider 7 is always a sum of absolute positions containing no error, not requiring the residual of the division to be added at the next sampling time, because the output of the divider 7 itself represents the absolute position. For example, with the accumulated value of the positional increment Δx after the acceleration and deceleration processes until (n+2)-th time being x, it will be expressed as follows:

$$x(n + 2) = \Delta x(0) + \Delta x(1) + \ldots + \Delta x(n + 2)$$
$$= \{(\Sigma X(0) - \Sigma X(0 - p))/p\} - \{(\Sigma X(0 - 1) - \Sigma X(0 - p - 1))/p\} + \{(\Sigma X(1) - \Sigma X(1 - p))/p\} - \{(\Sigma X(1 - 1) - \Sigma X(1 - p - 1))/p\} + \{(\Sigma X(2) - \Sigma X(2 - p))/p\} - \{(\Sigma X(2 - 1) - \Sigma X(2 - p - 1))/p\} +$$
. 
. 
$$\{(\Sigma X(n) - \Sigma X(n - p))/p\} - (\Sigma X(n - 1) - \Sigma X(n - p - 1))/p\} + \{(\Sigma X(n + 1) - \Sigma X(n - m + 1))/m\} - \{(\Sigma X(n) - \Sigma X(n - p))/p\} + \{(\Sigma X(n + 2) - \Sigma X(n - m + 2))/m\} - \{(\Sigma X(n + 1) - \Sigma X(n - m + 1))/m\}$$

In this case, the terms surrounded by {} are outputs at sampling times of the divider 7, and the first term of each line and the second term of the next line are opposite in code but equal in absolute value, so that they are eliminated. (These terms are the quotient of the divisional operation so as to contain calculation errors, but the terms to be eliminated are equivalent to the previous input value and currently stored value of the difference calculator 8 so as to be completely identical.) As a result, it will be expressed as follows:

$$x(n+2)=\{(\Sigma X(n+2)-\Sigma X(n-m+2))/m\}-\{(\Sigma X(0-1)-\Sigma X(0-p-1))/p\}$$

Here, if the initial value of ΣX and X is assumed to be zero, the second term becomes zero so that:

$$x(n + 2) = (\Sigma X(n + 2) - \Sigma X(n - m + 1))/m$$
$$= \{X(n - m + 3) + X(n - m + 4) + \ldots + X(n + 2)\}/m$$

Therefore, the calculation errors of division will not accumulate. Assuming that m sampling periods have passed after stopping of the movable shaft (i.e. ΔX−0) and that the sampling time at that point is the q-th sampling period:

$$\Delta x(q)=\{X(q)-X(q-m)\}/m$$

At this time, since there is a relationship of X(q)=X(q−m), then:

$$\Delta x(q)=0$$

so that it will not be affected by the calculation errors of the division. The stopping position at this time can be expressed as follows:

$$x(q)=\{X(q-m)+X(q-m+1)+\ldots +X(q)\}/m$$

Since the values from X(q−m) to X(q) are identical, they can all be replaced with X(q):

$$x(q)=\{m*X(q)\}/m \quad x(q)=X(q)$$

As a result, this value is also no subject to effects of the calculation error so as to become equal to the absolute position X being an accumulation of the positional moving amount ΔX from the host controller 1.

Figure 9:
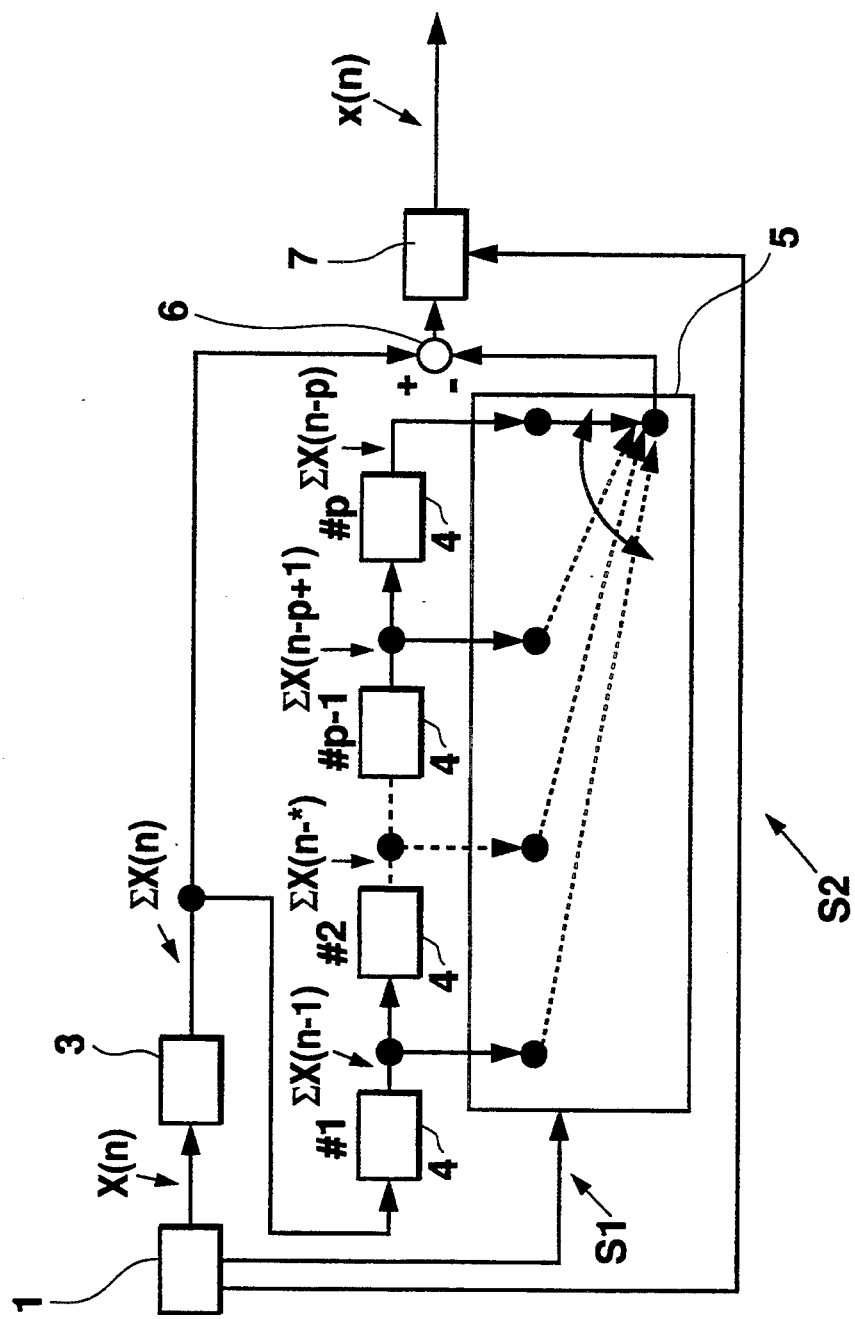
FIG. 9 is a block diagram showing a second embodiment according to this invention.

FIG. 9 is a schematic block diagram showing a second embodiment of this invention.

By removing the accumulator 2 and the difference calculator 8 of the acceleration and deceleration controlling apparatus according to the first embodiment, the host controller 1 instructs an absolute position so as to be readily used as an acceleration and deceleration controlling apparatus when a device to be connected thereto is a position controlling device with an absolute position as its input. The apparatus shown in FIG. 9 operates in the same manner as that in the first embodiment.

Figure 10:
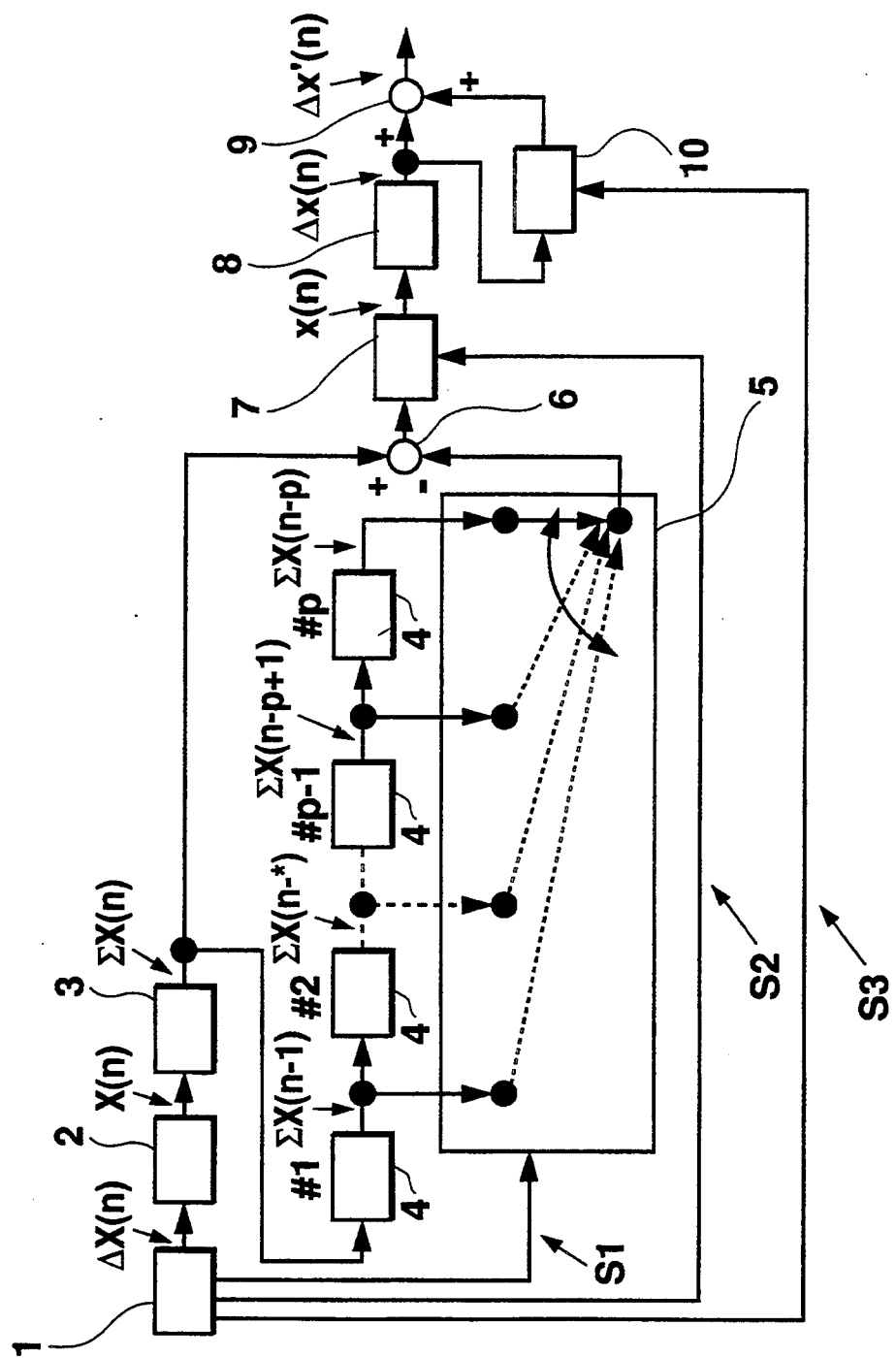
FIG. 10 is a block diagram schematically showing a third embodiment according to this invention.

FIG. 10 is a schematic block diagram showing an apparatus according to a third embodiment of this invention.

While the first embodiment has an advantage that no error arises by the switching operation of the time constant for the acceleration and deceleration when an absolute position is calculated by accumulating positional increment Δx after the acceleration and deceleration processes, its transient response during the switching operation would become too large. This will be described with reference to FIGS. 11A and 11B. In FIGS. 11A and 11B, the vertical and horizontal axes represent positional displacement and sampling times respectively, and the upper stage shows a state of input and output when the number of stages of the buffer registers 4 of the acceleration and deceleration apparatus according to the first embodiment is changed from six to three. The input waveform 1 (oblique lines) represents positional displacement ΔX, and the output waveform 1 (thick lines) represents positional moving amount Δx after the acceleration and deceleration processes. When the switching operation is carried out at the tenth sampling time, a discontinuous positional moving amount arises at the eleventh sampling time so as to make the operation of the position controlling device of the subsequent stage discontinuous, which would cause undesirable impact to the movable parts connected to the position controlling device, leading to failure.

In contrast, FIG. 10 is a schematic block diagram of an acceleration and deceleration apparatus which can smoothly combine the transient discontinuous responses and avoid accumulating errors in the absolute position. There are provided: an accumulator 2 for accumulating positional displacement $\Delta X$ from the host controller 1 at each sampling time to calculate the absolute position X; an accumulator 3 for further accumulating the absolute positions X from the accumulator 2 to calculate accumulated value $\Sigma X$ of the absolute positions; and serially connected buffer registers #1, #2, . . . , #(p−1), #p. An accumulated value $\Sigma X$ of the newest absolute position calculated by the accumulator 3 is stored in the buffer register #1 and the contents of each buffer register is transferred to the buffer register of the next stage. A switching means 5 reads out the contents of a buffer register designated by a time constant-switching signal supplied from the host controller 1 and outputs them to a subtracter 6, which then subtracts the contents of the buffer register 4 read out by the switching means 5 from the accumulated value $\Sigma X$ of the newest absolute position. A divider 7 divides the subtracted result by a divisor designated by a divisor-switching signal supplied from the host controller 1. A difference calculator 8 calculates a difference between the quotient from the divider 7 and a one sample-previous quotient having been stored. An interpolator 10 holds each results of division provided by the divider 7 for each sampling period, and when an interpolator-starting signal is supplied from the host controller 1, calculates a difference between the result of the newest division and that of one sample-previous division, and then outputs an interpolation amount corresponding to the difference amount. An adder 9 adds the interpolation amount to the output of the difference calculator 8.

The operations of the differentiator until its output are the same as those in the first embodiment. Switching operation at input states shown in FIGS. 11A and 11B will now be described. At a sampling time just before the switching, a positional moving amount $\Delta x(9)$ after ninth acceleration and deceleration processes is output from the difference calculator 8. The interpolator 10 stores $\Delta x(9)$. At the ten-th sampling time, when the host controller 1 outputs an interpolator-starting signal S3, the interpolator 10 calculates the difference between the output $\Delta x(10)$ of the divider 7 and a stored output $\Delta x(9)$, adds the calculated difference to the total interpolation amount, and further multiplies the total interpolation amount by a predetermined coefficient to render an interpolation amount. The interpolator 10 subtracts the difference value having been added to the total interpolation amount from the calculated interpolation amount and outputs the subtracted result, and also subtracts the interpolation amount from the total interpolation amount to provide a new total interpolation amount.

At the eleventh sampling time, when the divider 7 outputs $\Delta x(11)$, the total interpolation amount is multiplied by a predetermined coefficient to provide an interpolation amount which is then output to the adder 9, and the interpolation amount is subtracted from the total interpolation amount to render a new total interpolation amount. When the absolute value of the total interpolation amount becomes small to a certain degree, all the residual total interpolation amount is regarded as an interpolation amount to be output to the adder 9 while the total interpolation amount becomes zero.

Figure 12:
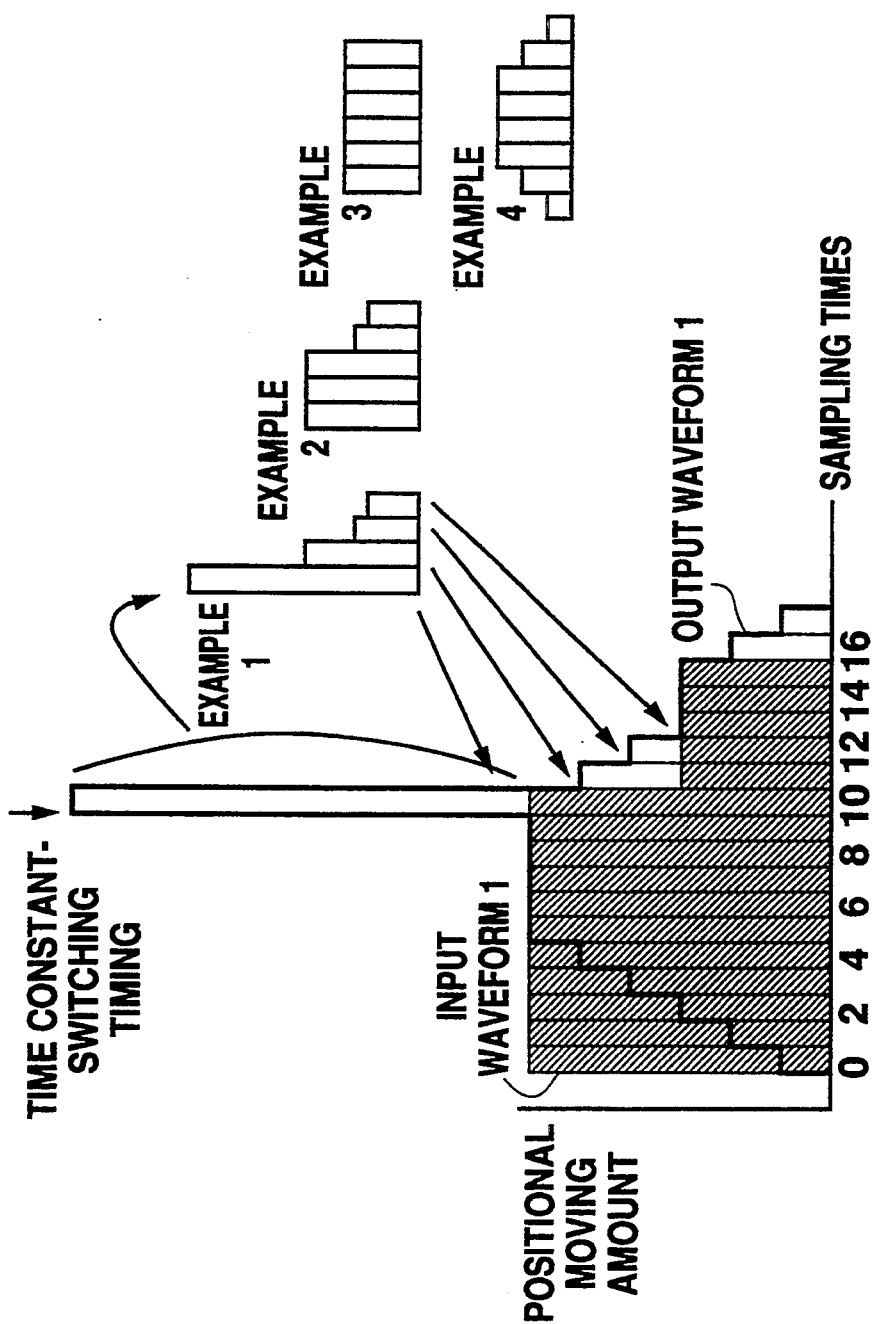
FIG. 12 is an explanatory view for the acceleration and deceleration time constant and accelerating and decelerating processing.

At this time, the interpolator 10 updates the holding $\Delta x$ at each sampling time and calculates the difference value only when the interpolator-starting signal is supplied, otherwise the difference value is zero. In this manner, the interpolation amount can be calculated as shown in the first embodiment shown in FIG. 12. This is just an example, and alternatively it is also possible to use the acceleration and deceleration device shown in FIG. 8. Namely, the difference between $\Delta x(10)$ and $\Delta x(9)$ is calculated during the switching operation and is then output to the adder with a reversed polarity (code). At the next sampling time, accelerating and decelerating processes are performed by use of the accelerating and decelerating device shown in FIG. 8 and the difference value is sequentially output to the adder 10. As a result, the interpolation amount would become as shown in the example 3 in FIG. 12. An example 2 shown in FIG. 12 represents a case when a maximum value of the interpolation amount is defined. The example 3 in which the interpolation amount is equally divided by a certain value can be realized by the aforementioned process. In an example 4 it is further subject to the acceleration and deceleration processes. These methods can be desirably selected in accordance with the use and purpose.

Figure 13:
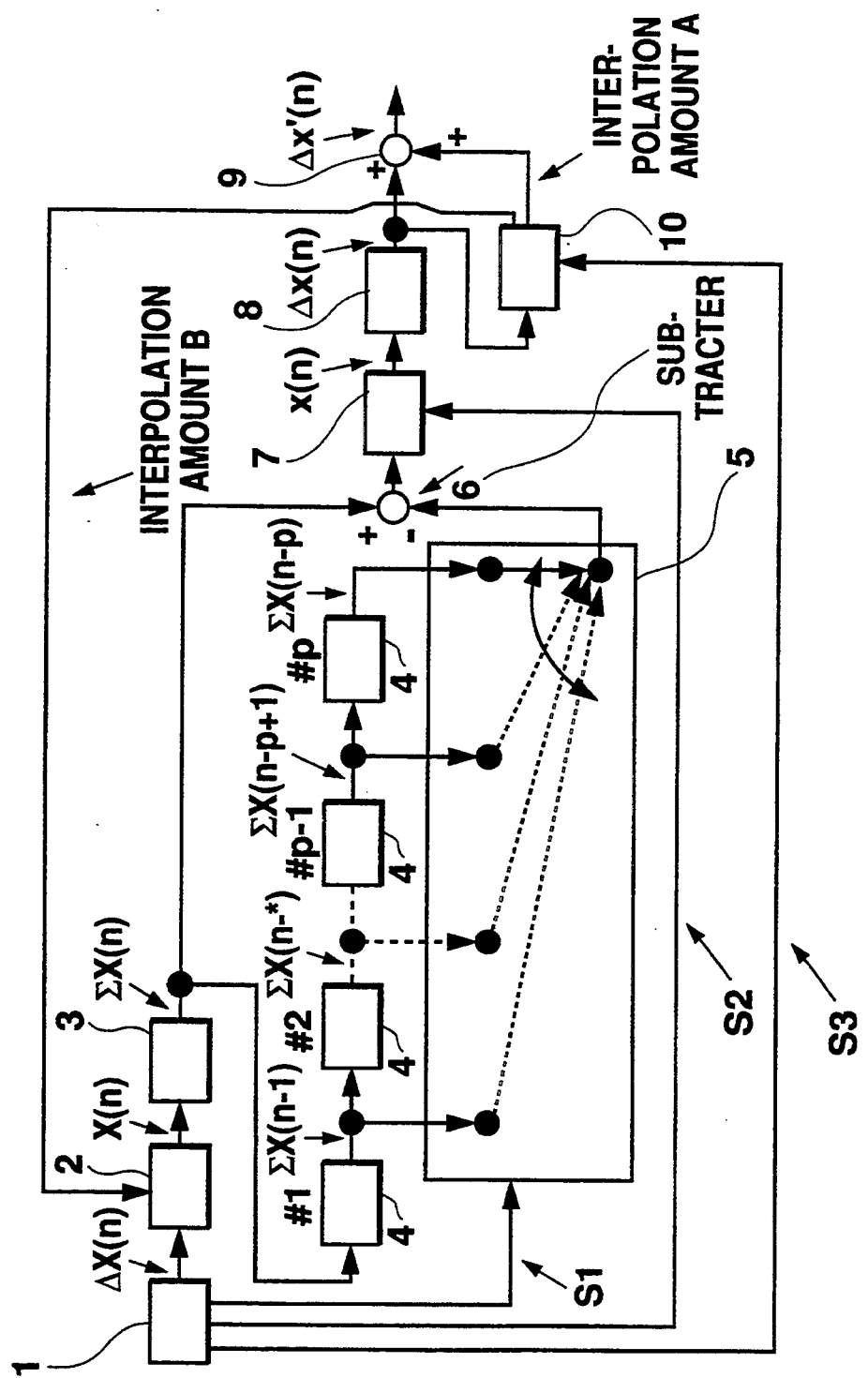
FIG. 13 is a block diagram schematically showing a third embodiment according to this invention.

A fourth embodiment of this invention is shown in FIG. 13.

Operations similar to those in the third embodiment can be realized using the accelerating and decelerating apparatus itself shown in FIG. 10. FIG. 13 is its schematic block diagram. The operations until the output of the difference calculator 8 are the same as in the first embodiment. A switching operation in the case of the input shown in FIG. 11A will now be described. At a sampling time just before the switching operation, a positional displacement $\Delta x(9)$ after the acceleration and deceleration processes is output from the difference calculator 8. The interpolator 10 stores $\Delta x(9)$. At the tenth sampling time, when an interpolator-starting signal is output from the host controller 1, the interpolator 10 calculates a difference between the output $\Delta x(10)$ of the divider 7 and $\Delta x(9)$ having been stored. The interpolator 10 calculates a difference value between $\Delta x(10)$ and $\Delta x(9)$ during the switching operation and outputs it with reversed polarity to the adder as an interpolation amount A. Then, the output $\Delta x'(11)$ of the adder 9 becomes equal to the previous output $\Delta x'(10)$. The interpolator 10 outputs the difference value directly to the accumulator 2 as an interpolation amount B at the next sampling time. The accumulator 2 adds the interpolation amount B from the interpolator 10 and the positional moving amount $\Delta X(11)$ from the host controller 1 to the previous accumulated value X(10) to render an output value $\Delta X(11)$. In this manner, it is possible to smoothly and readily switch the time constant by adding the interpolation amount to the input of the acceleration and deceleration processes.

What is claimed is:

1. An acceleration and deceleration controlling apparatus for a numerically controlled machine comprising:
   a first accumulator for accumulating positional moving amounts supplied from a host controller at each sampling period to calculate an absolute position;

a second accumulator for further accumulating absolute positions from said first accumulator to calculate an accumulated value of absolute positions;

a series of serially connected buffer registers coupled to said second accumulator in which a buffer register of a first stage stores the latest accumulated value of the absolute values at each sampling time and supplies the previously stored accumulated value to a buffer register of a next stage;

a switching means for reading out contents stored in a buffer register of a stage determined by a time constant-switching signal supplied from the host controller;

a subtracter for subtracting the contents of the buffer register having been read out by the switching means from the latest accumulated value of the absolute positions;

a divider for dividing the calculated value of the subtracter by a divisor determined by a divisor-switching signal supplied from the host controller; and a difference calculator for producing a control signal to control acceleration and deceleration by calculating a difference between the quotient from the division and that stored for the previous sampling time.

2. An acceleration and deceleration controlling apparatus according to claim 1, wherein said apparatus further comprises:

an interpolator for calculating a difference between the results in the current difference calculation and the previous one by an interpolator-starting signal supplied from the host controller to output an interpolation amount corresponding to the difference value; and an adder for adding the interpolation amount to the output of the difference calculator.

3. A method for controlling acceleration and deceleration of a numerically controlled machine, comprising the steps of:

accumulating positional moving amounts supplied from a host controller at each sampling period to calculate an absolute position;

further accumulating the absolute positions to calculate an accumulated value of the absolute positions;

storing the latest accumulated value of the absolute positions in a buffer register of a first stage among a plurality of serially connected buffer registers and outputting a value stored at the previous sampling time to a buffer register of a next stage;

reading out contents stored in a buffer register of a stage which is determined by a time constant-switching signal supplied from the host controller;

subtracting the read out contents of the buffer register from the latest accumulated value of absolute positions;

dividing the subtracted result by a divisor determined by a divisor-switching signal from the host controller;

calculating a difference between the quotient of the current division and that at the previous sampling time; and in response to calculating said difference, producing a control signal to control acceleration and deceleration.

4. A method according to claim 3, wherein said method further comprises steps of:

calculating a difference between the results in the current difference calculation and that at the previous time by an interpolator-starting signal supplied from the host controller to output an interpolation amount corresponding to the calculated difference value; and adding the interpolation amount to the control signal.

* * * * *